United States Patent

[11] 3,607,175

| [72] | Inventor | Albert Sidney Robinson<br>Southport, England |
|---|---|---|
| [21] | Appl. No. | 759,455 |
| [22] | Filed | Sept. 12, 1968 |
| [45] | Patented | Sept. 21, 1971 |
| [73] | Assignee | Pilkington Brothers Limited<br>Liverpool, Lancashire, England |
| [32] | Priority | Nov. 9, 1967 |
| [33] | | Great Britain |
| [31] | | 51050/67 |

[54] CONTROL SYSTEM FOR MODIFYING THE SURFACE OF FLOAT GLASS
13 Claims, 9 Drawing Figs.

[52] U.S. Cl. .................................................. 65/29,
65/30, 65/99 A, 65/158, 65/160, 65/182 R, 118/8
[51] Int. Cl. ........................................................ C03b 18/02
[50] Field of Search ............................................ 65/29, 30,
99, 182, 160, 161, 158; 221/238, 268, 270;
222/243

[56] References Cited
UNITED STATES PATENTS

| 2,746,420 | 5/1956 | Steigerwald ................ | 118/8 |
| 3,351,447 | 11/1967 | Lawrenson ................. | 65/182 X |
| 3,467,508 | 9/1969 | Loukes et al. .............. | 65/99 X |

*Primary Examiner*—S. Leon Bashore
*Assistant Examiner*—J. B. Hardaway
*Attorney*—Morrison, Kennedy & Campbell ABSTRACT: Desired characteristics are imparted to float glass by maintaining a body of molten material in contact with the upper surface of the floating glass ribbon to migrate ions from the molten material into the surface of the glass, photoelectrically, sensing any change in the rate of modification of the glass surface, and employing an indication of that change to restore a desired rate of modification.

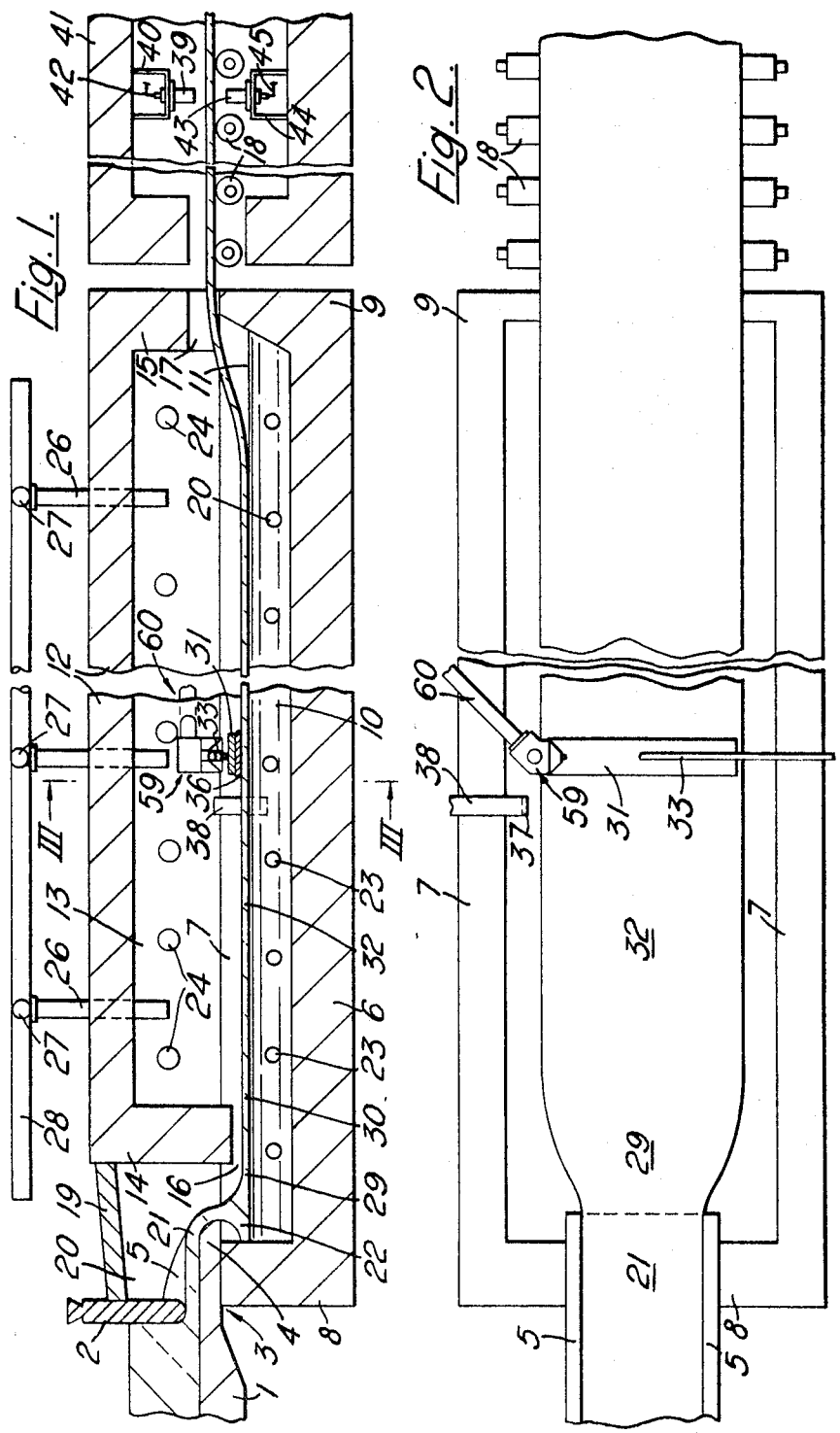

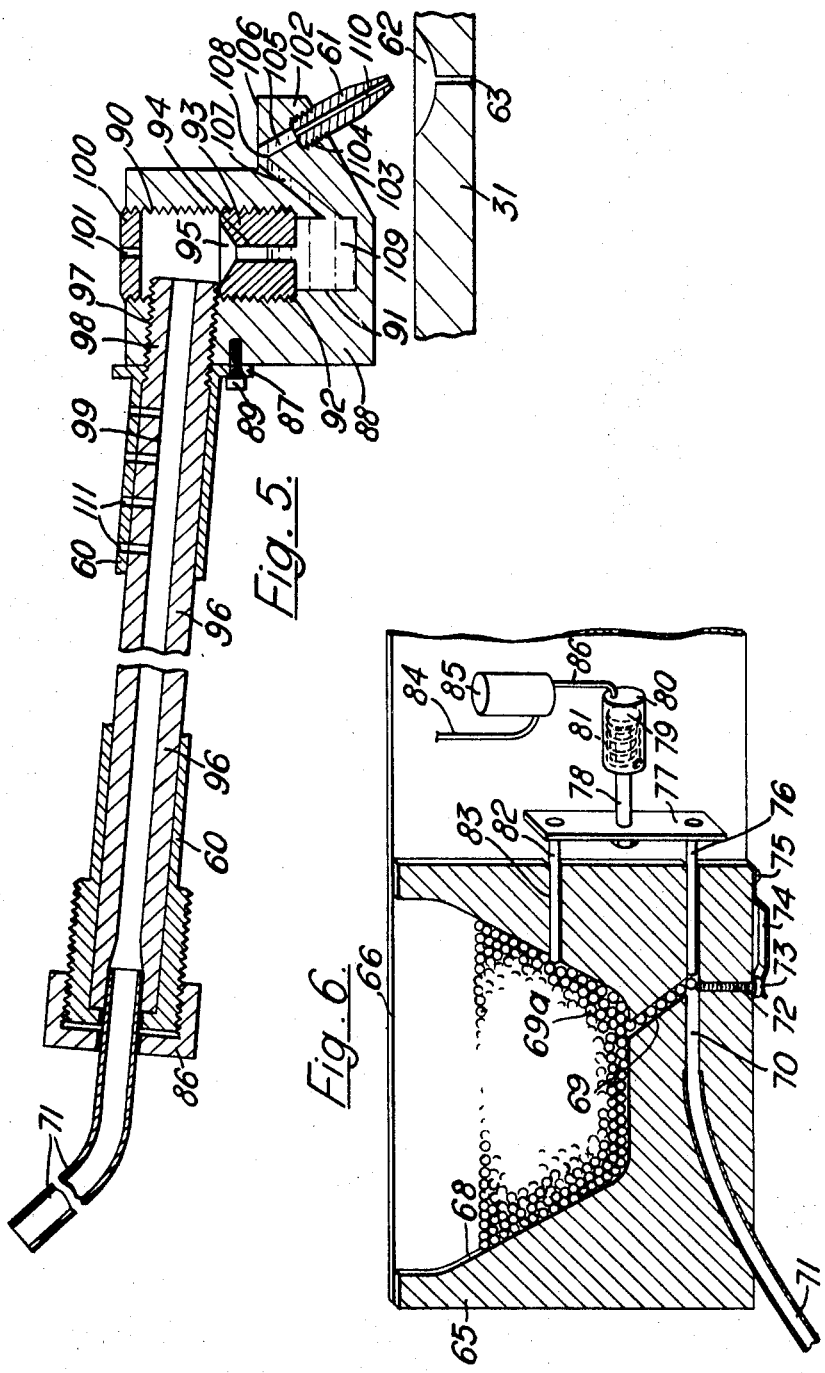

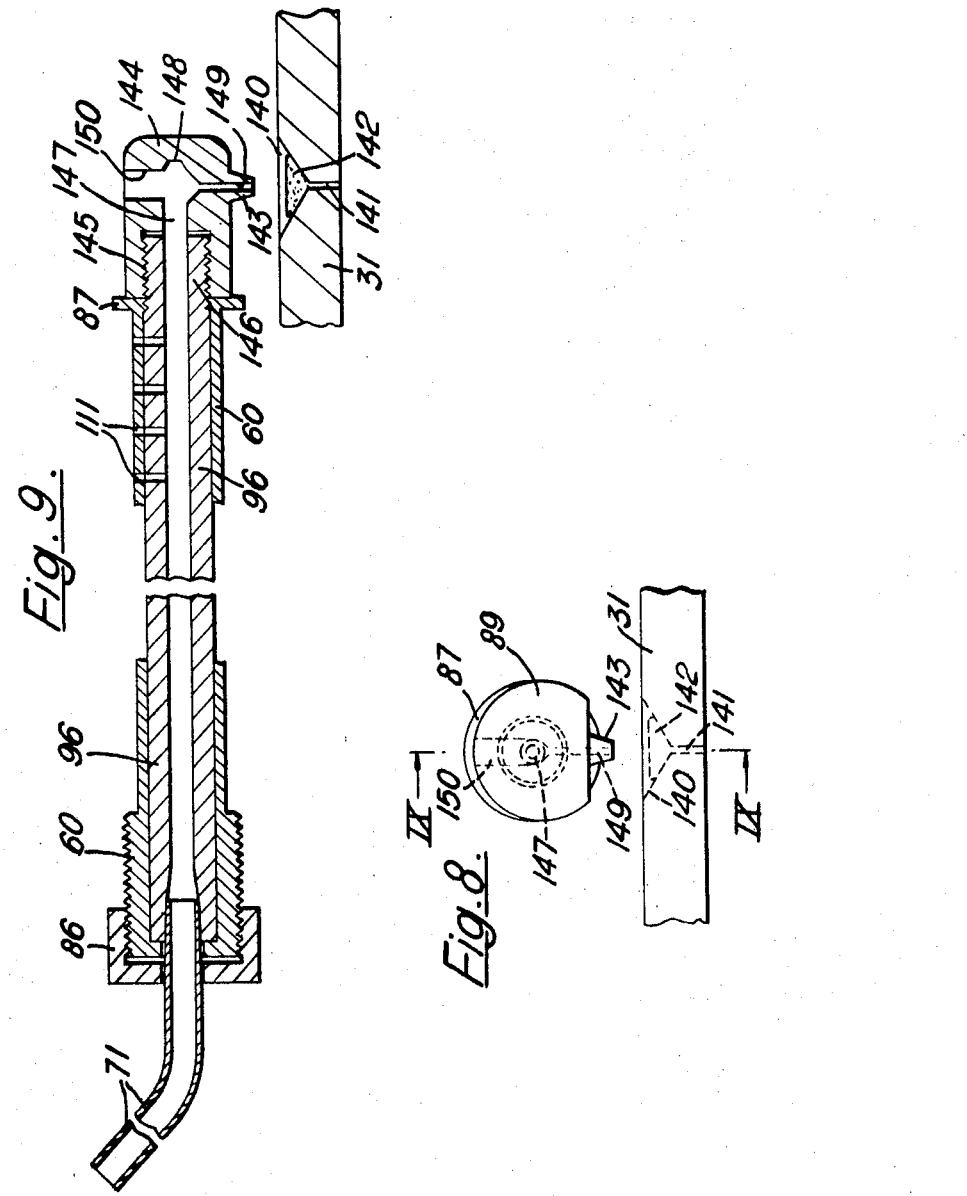

CONTROL SYSTEM FOR MODIFYING THE SURFACE OF FLOAT GLASS

BACKGROUND OF THE INVENTION

This invention relates to the manufacture of flat glass having desired characteristics, in which a body of molten material is confined in contact with a surface of a ribbon of glass which is being advanced along a bath of molten metal as described, for example, in the Loukes et al., U.S. Pat. No. 3,467,508. The molten metal bath may be a bath of molten tin or of a molten tin alloy in which tin predominates and which has a specific gravity greater than that of glass.

The modification of the surface of the glass by material from the body of molten material which is located in contact with the glass necessarily results in depletion of that body. It has been found that in order to maintain uniformity in the production of desired characteristics in an advancing ribbon of glass, it is desirable to control the contact area between the body of molten material and the glass surface, and it is a main object of the present invention to provide an improvement in the manufacture of flat glass on a bath of molten metal, which glass has desired characteristics, in which the configuration of the contact area between the body of molten material and the glass surface is maintained.

SUMMARY

According to the invention a method of manufacturing flat glass having desired characteristics in which a body of molten material is maintained in contact with a surface of an advancing ribbon of glass characterized by sensing a change in the rate of modification of the glass surface by said molten material, producing a signal indicative of that change, and employing that signal to restore a desired rate of modification of the glass surface.

One method of operating the invention is characterized by maintaining the configuration of the contact area between said body of molten material and the glass surface sufficient to produce said desired characteristics, by sensing a characteristic of the treated ribbon of glass, producing a signal indicative of any change in the sensed characteristic, and employing that signal to regulate the feeding of material into the body of molten material contacting the glass.

The desired characteristic produced in the ribbon of flat glass may be a surface characteristic, for example a particular characteristic of reflectivity, color, or electrical conductivity of the glass.

To this end the body of molten material may be a pool of a molten metal, for example a relatively low melting point metal, such as tin or lead, or a molten alloy which includes a low melting point metal to depress the melting point of the alloy, or a molten salt, for example a halide of silver, copper, zinc, sodium, potassium or lithium.

The body of molten material may be confined on the upper surface of the ribbon of glass by members which are mounted just above the path of travel of the ribbon of glass and which surround the body of molten material.

Alternatively the body of molten material may cling by surface tension forces to a locating member extending tranversely of the ribbon of glass advancing along the bath of molten metal, which locating member is mounted just above the path of the top face of the glass.

When electric current is passed between the body of molten material, which is in this instance a body of molten electrically conductive material, and the glass, the temperature of the glass is sufficiently high to ensure a reasonable electrical conductivity of the glass sufficient to enable the passage of a current through the glass which will cause modification of the surface of the glass which is contacted by the body of molten electrically conductive material.

Migration of modifying material into the surface of the ribbon of glass under the influence of the electric current results in a depletion of that body, and from this aspect the invention provides a method of manufacturing flat glass having desired characteristics in which a body of molten electrically conductive material is confined in contact with the upper surface of a ribbon of glass being advanced along a bath of molten metal, and controlled electric current is passed between the electrically conductive material and the glass in order to produce a desired characteristic in the glass, by sensing a characteristic of the treated ribbon of glass, producing a signal indicative of any change in the sensed characteristic, and employing that signal to regulate the feeding of electrically conductive material into the body of molten material contacting the glass. The signal may be used to regulate the electrolyzing voltage applied to the pool.

A convenient indication of a change in the characteristic of the glass is by the sensing of the light transmitted through the glass. Another way would be to set up the sensing arrangement so that color imparted to the glass by the method of the invention is sensed.

In a preferred embodiment of the invention the light transmitted through the glass from a constant output light source is sensed, a signal indicative of a change in the transmission of light through the glass is produced, and that signal is employed for selective control of the feeding of electrically conductive material into the body and of the electric current passed between the body of molten material and the glass.

The strength of the electric current passing between the body of molten material and the glass determines the amount of modifying material entering the surface of the glass and hence the rate at which depletion of the body of molten material takes place and it is therefore preferred that the control of the feeding of material into the body shall be maintained in proportion to the electric current passing between the body of molten material and the glass.

In the case where the body of molten material is constituted by a molten alloy, for example an alloy of tin, or lead, or bismuth as solvent metal with a solute metal which is to be caused to enter the upper surface of the ribbon of glass, for example silicon, titanium, manganese, chromium of iron, then the feed of the solute metal into the molten body is controlled. At the temperature of operation there is a definite phase relationship between the solvent metal and the solute metal in the alloy, and the locating member which ensures that the body of molten material is confined against the surface of the ribbon of glass, may be of the solute metal, which is solid at the temperature of operation, so that as solute metal enters the glass surface from the alloy it is replaced in the alloy by metal dissolved into the alloy from the locating member.

Alternatively, the feed into the body of molten material may be of the solute metal alone, the amount of solvent metal remaining constant.

In order that the feeding of the material into the body of molten material shall not endanger the stability of that body, in particular shall not extract heat or otherwise reduce the temperature of that body, it is preferred according to the invention that there should be a preliminary controlled feed of the material into a molten reserve of that material. This reserve may be near to the body of molten material so that the material being fed adopts a new thermal state and in some instances a new chemical state, in particular where there is a chemical atmosphere in the head space over the bath, so that the material actually entering the body of molten material is substantially in the same state as the material already in that body.

From this aspect of the invention the signal is employed to control a feed of the material into a molten reserve of that material, from which reserve there is a regulated feed of molten material into the body of molten material contacting the glass. This controlled feeding into a molten reserve of the material and then the regulating of a restricted feed of the material from that reserve into the body of molten material, ensures that there is a gradual and continuous feed replenishing the active constituent of the body of molten material without disturbing the physical conditions or form of that body of material on the glass surface.

The uniformity of that body is thus enhanced giving an additional control of the uniformity of the change in surface characteristics produced over the whole of the surface of the glass as it is advanced.

The material usually enters the body of molten material in liquid form and it has been found preferable to provide a controlled feed of the material towards the body in the form of pellets which may melt on their way to the body.

The invention also comprehends apparatus for use in the manufacture of float glass having desired surface characteristics, comprising a tank structure containing a bath of molten metal, means for delivering glass at a controlled rate to the bath and advancing the glass in ribbon form along the bath, temperature regulators in the tank structure for thermally conditioning the advancing glass, means for holding a body of molten material in contact with the upper surface of the advancing ribbon of glass, a supply duct for the material terminating adjacent said holding means, and means for regulating the feeding of material through that duct so as to maintain the configuration of the contact area between the body of molten material and the glass surface.

The uniformity of the surface treatment of the glass depends upon maintaining as near constant as possible the configuration of the contact area between the body of molten material and the glass surface, this being related to the rate of advance of the ribbon of glass. The length of the body of molten material considered in the direction of advance of the glass is an important factor in the control of configuration of the contact area.

As mentioned above the uniformity of the treatment of the advancing ribbon is checked by sensing continuously the characteristic of the ultimate ribbon of glass produced and employing any change in that characteristic to control the treatment of the glass.

The apparatus according to the invention further includes, in a preferred embodiment, a sensing device for sensing the intensity of a characteristic of the treated ribbon, which device is mounted beyond the outlet for the ribbon from the tank structure, a supply container for the material having a valved outlet for controlling the feeding of material from that container, and a control device for the valved outlet, which control device is connected to the sensing device and is operable in response to any change in the characteristics being sensed to control the feeding of the material into the supply duct.

When carrying out the electrical treatment of the surface of the ribbon of glass the holding means for the body of molten electrically conductive material is preferably constituted as an anode, a current supply circuit is connected to the holding means, and the current supply circuit includes regulating means connected to the sensing device, whereby the current supply to the anode is variable under control of any change in the sensed characteristic of the glass.

Preferably the body of molten material is located in contact with the glass surface by clinging to a bar-shaped locating member mounted in the tank structure across and above the path of travel of the glass, and a feed hole is formed down through the bar originating in a depression in the top surface of the bar, into which depression the material is fed.

The bar-shaped locating member may simply serve to locate the body of molten material which clings to that bar, electrical connection being made to the body by a connector dipping into the body. Preferably, however, the bar-shaped locating member itself forms the anode of the electrolytic system being employed for modifying the surface characteristics of the glass.

The advantages of employing a molten reserve of the material to be added to the body of molten material have been set out above, and in order to provide this molten reserve in a preferred embodiment of invention, the supply duct leads to a reservoir of the molten material mounted above the path of travel of the ribbon of glass, and a discharge outlet from the reservoir is formed to regulate the feed of molten material towards the body.

In order to permit the regulated feed of material from the reservoir through the discharge outlet into the body of molten electrically conductive material, it is preferred in one embodiment of the invention to locate the inlet to the discharge outlet at a predetermined height relative to the reservoir so that feeding of material from the reservoir only takes place when the height of the molten material in the reservoir exceeds that predetermined height.

In one embodiment of the invention the reservoir is formed in a graphite feed head fixed to and supported by the supply duct, which is constituted by a graphite lined steel casing to which casing the head is fixed, a downwardly inclined graphite spout is fixed into the head, and the spout communicates with the reservoir by an inclined pipe system in the graphite head, which defines a knife edge at its highest point on a level with the liquid level in the reservoir, so that the supply of material into the reservoir through the duct causes a feed of molten material down the spout into the body of molten material.

In a simplified alternative construction the depression in the top surface of the bar may be formed as a target hole in which a reserve of molten material can be held, a fine bore feed hole passes through the bar from the target hole, and a graphite feedhead is mounted above the target hole on the end of a supply duct which supports the head, the head being formed with a supply hole communicating with the supply duct through which pellets of the material are supplied and a nozzle communicating with the supply hole through which the electrically conductive material falls into the target hole in the bar. produced by The invention further comprehends flat glass having desired characteristics produced by the method and by means of the apparatus as set out above.

BRIEF DESCRIPTION OF THE DRAWINGS

FIG. 1 is a sectional elevation of apparatus according to the invention, illustrated by way of example, including a tank structure containing the bath of molten metal, a roof structure over the tank structure and apparatus for pouring molten glass on to the bath and for holding a body of molten material between a bar-shaped electrode and the upper surface of the ribbon of glass, FIG. 2 is a plan view of the apparatus of FIG. 1 with the roof structure removed, FIG. 5 is a section on line V—V of FIG. 5 showing the internal construction of the feedhead and the supply duct by which material is supplied to the feedhead, FIG. 6 is a detailed view of a dispenser hopper for pellets of material to be fed into the body of molten material, which hopper is illustrated diagrammatically in FIG. 3, FIG. 8 is an end view of an alternative form of feedhead for use when the depression in the upper surface of the bar-shaped electrode is sufficiently deep to provide a reservoir of molten material, and FIG. 9 is a sectional view on line IX—IX of FIG. 8 also showing construction of a supply duct feeding the material to the head.

In the drawings like references indicate the same or similar parts.

DESCRIPTION OF THE PREFERRED EMBODIMENT

Figure 3:
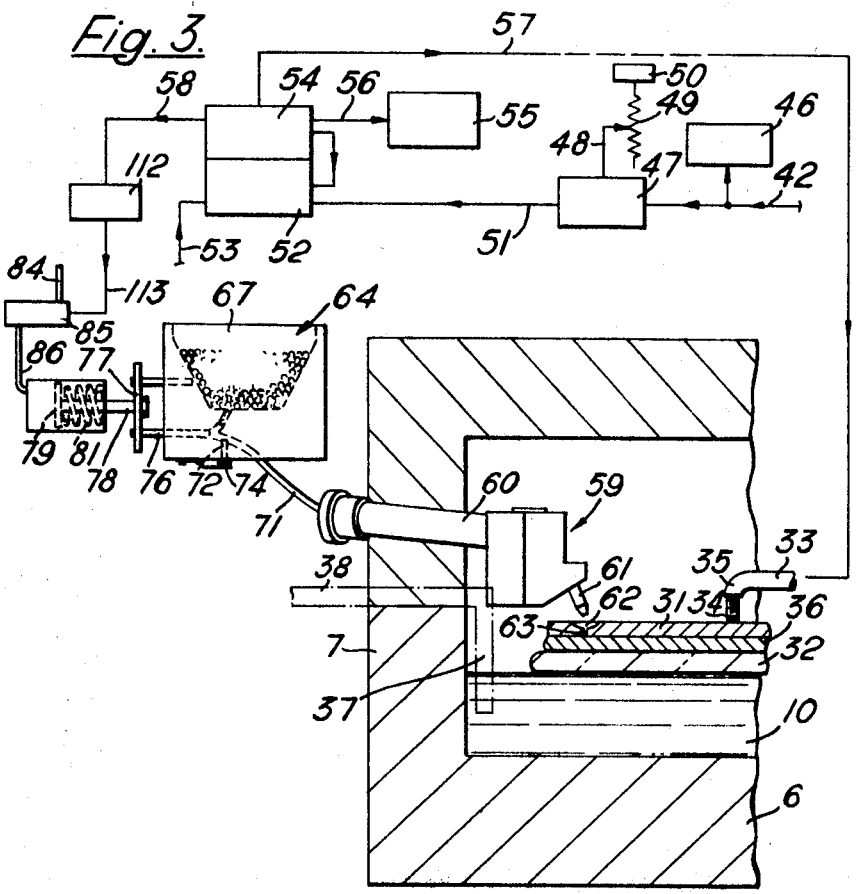
FIG. 3 is a sectional view on line III—III of FIG. 1 showing in detail the bar-shaped electrode and a manner of controlling the feed of electrically conductive material into the body of molten material which clings beneath the electrode.

Referring to FIGS. 1 and 2 of the drawings a forehearth of a continuous glass-melting furnace is indicated at 1 and a regulating wheel at 2. The forehearth ends in a spout 3 comprising a lip 4 and side jambs 5 one of which is shown in FIG. 1. The lip 4 and side jambs 5 together constitute a spout of generally rectangular cross section. The spout 3 is disposed above the floor 6 of an elongated tank structure including sidewalls 7 joined together to form an integral structure with the floor 6, an end wall 8 at the inlet end of the tank and an end wall 9 at the outlet end of the tank. The tank structure holds a bath of molten metal 10 whose surface level is indicated at 11. The bath is for example a bath of molten tin or of a molten tin alloy in which tin predominates and which has a specific gravity greater than that of the glass.

A roof structure is supported over the tank structure and the roof structure includes a roof 12, integral sidewalls 13, and integral end walls 14 and 15 respectively at the inlet and outlet ends of the bath. The inlet end wall 14 extends downwardly close to the surface 11 of the molten metal, defining with that surface an inlet 16 which is restricted in height and through which molten glass is advanced. The outlet end wall 15 of the roof structure defined with the outlet end wall 9 of the tank structure an outlet 17 through which the ultimate ribbon of glass produced on the bath is discharged onto driven conveyor rollers 18 mounted outside the outlet end of the tank structure and disposed somewhat above the level of the top of the end wall 9 of the tank structure so that the ribbon is lifted clear of the wall 9 for discharge through the outlet 17. The rollers 18 convey the ultimate ribbon of glass to an annealing lehr in well known manner and also apply tractive effort to the ribbon of glass to assist in advancing the ribbon as it glides along the surface of the bath 10.

An extension 19 of the roof structure extends up to the wheel 2 and forms a chamber having sidewalls 20 in which the spout 3 is disposed. Molten soda-lime-silica glass 21 is poured onto the bath 10 of molten metal from the spout 3 and the wheel 2 regulates the rate of flow of the molten glass 21 over the spout lip 4. This lip is vertically spaced from the surface 11 of the bath so that there is a free fall of the molten glass 21 through a distance of a few inches, which is exaggerated in FIG. 1, to the level of the glass surface 11. This free fall is such as to ensure the formation of a heel 22 of molten glass behind the glass 21 pouring over the spout, which heel extends back to the inlet end wall 8 of the tank structure.

The temperature of the glass as it is advanced along the bath is regulated from the inlet end down the discharge end by temperature regulators 23 immersed in the bath 10 and temperature regulators 24 mounted in the headspace defined by the roof structure over the bath.

A protective gas is supplied to the headspace through ducts 26 which are provided at intervals in the roof 12. The ducts 26 are connected by branches 27 to a header 28 which is connected to a supply of protective gas, and the protective gas may be insert gas or may contain a reducing constituent for example a proportion of hydrogen. Thus a plenum of protective gas is maintained in the substantially closed headspace and there is outward flow of protective gas through the inlet 16 and the outlet 17 from the headspace.

The temperature of the molten glass delivered to the bath is regulated by the temperature regulators 23 and 24 as the glass is advanced along the bath so as to ensure that a layer of molten glass is established on the bath. This layer is advanced through the inlet 16 and during this advance there is unhindered lateral flow of molten glass under the influence of surface tension and gravity to the limit of the free flow of the glass in order to develop on the bath surface from the layer 29 a buoyant body 30 of molten glass which is then advanced in ribbon form along the bath. The width of the tank structure at the surface level of the bath is greater than the width of the buoyant body 30 of molten glass so that there is no hindrance to the initial free lateral flow of the molten glass.

In order to impart desired characteristics to the upper face of the ribbon of glass a molten electrically conductive material is maintained by surface tension forces in contact with the upper surface of the glass and the glass is moved beneath the body of molten electrically conductive material as described in copending application Ser. No. 733,109 filed May 29, 1968.

A bar-shaped electrode 31 is mounted transversely of the ribbon of glass 32 which is being advanced along the bath of molten metal. The bar-shaped electrode 31 is mounted just above the upper surface of the glass so that a gap, for example of about one-quarter inch is left between the bottom of the electrode and the path of travel of the surface of the glass (see FIGS. 3 and 4). The electrode 31 is maintained in position by a connection rod 33 which extends into the headspace over the bath through the sidewall of the tank and is connected to the center of the electrode. Electrical insulating means (not shown) may also be provided for assisting in locating the electrode 31 accurately adjacent the upper surface of the ribbon of glass 32.

The rod 33 as well as serving for mounting the bar-shaped electrode 31 of the upper surface of the glass 32 is also an electrical conductor enabling the connection of an electric supply circuit to be made to the electrode 31. As shown in FIG. 3 a threaded bolt 34 is secured to the center of the upper surface of the electrode 31 and this bolt is screwed into the downturned end 35 of the connection rod 33.

A body of molten electrically conductive material 36 is suspended by surface tension forces from the lower surface of the electrode 31 and is confined between that surface and the upper face of the ribbon of glass 32. The molten electrically conductive material forming the body 36 wets onto and clings to the electrode 31 and so is suspended beneath the electrode 31 by surface tension forces interacting between the molten material 36 and the electrode 31. The ribbon of glass 32 which is advancing beneath the body of molten material 36 thus has to support a negligible amount of the weight of the body 36. For this reason the glass ribbon can be treated near the hot end of the bath as illustrated in FIGS. 1 and 2 where the temperature of the glass is for example in the range of 850° to 900° C., and although the glass is in a plastic condition the flatness of its upper surface is not affected by the molten material which is suspended in contact with its upper surface.

A second electrode 37 dips into the bath of molten metal alongside the path of travel of the ribbon 32 of the glass and this electrode 37 is mounted on a connecting rod 38 which extends through the sidewall 7 of the tank structure and is connected to the other terminal of the electric supply circuit.

The connection to the supply circuit is in such a sense that the bar-shaped electrode 31 effectively acts as the anode of the electrolytic system comprising the electrode 31, the body of molten material 36, the glass 32 and the bath of molten metal 10. The passage of current through the glass causes controlled migration of an element from the confined molten material 36 into the top surface of the glass thereby effecting a predetermined change in the characteristics of the glass as will be described below.

The electric current passing through the glass between the metal electrode 31 and the bath of molten metal 10 is regulated in relation to the speed of advance of the ribbon of glass and its temperature so that the migration and entry of an element into the upper surface of the ribbon of glass is accurately controlled, so controlling the amount of change of a characteristic of the surface of the glass.

Control of the current can be exercised by regulating the configuration of the pool or by regulating the applied voltage or by regulating both. Maintenance of the pool configuration is necessary even if current control is effected by regulating the applied voltage.

A tinting of the glass surface may be induced by the introduction of certain elements into the upper surface of the glass by the method of the invention. Other elements may vary the electrical conductivity of the surface so as to produce a surface layer which is more electrically conductive than the rest of the glass and which can be employed as an electrical resistance heater embodied in the glass surface. Another important application of the invention is to the manufacture of flat glass having a desired degree of reflectivity of one surface of the glass. This has particular application in the manufacture of solar heat rejection glass. A good solar heat rejecting glass is made by introducing lead into the upper surface of the ribbon of glass and then exposing the lead-rich surface to a reducing atmosphere maintained in the headspace over the bath during the continued travel of the ribbon of glass along the bath of molten metal towards the outlet from the bath. The introduction of lead induces a grey coloration and an increased reflectivity in the upper surface of the glass. To this end molten lead may be used for the body of molten material 36 and the bar-shaped electrode may be a platinum electrode or an electrode of ruthenium or rhodium plated with platinum. Other metals which can be employed as electrode with lead as the molten material are palladium, nickel or iron in the form of a sintered iron electrode which absorbs molten lead.

During the continuous passage of electric current between the body of molten lead 36 and the bath of molten metal, lead is continuously leaving the body of molten lead and crossing the interface into the upper surface of the glass under control of the existing electric field. It is the purpose of the present invention to provide continuously the maintenance of a desired amount of molten material, e.g., lead, in the body of molten material so that there is no change in the configuration of the contact area between the body of molten material and the upper surface of the glass.

This body of molten material extends right across the ribbon of glass and in order to achieve uniform treatment across the whole width the ribbon as well as to ensure uniformity of the treatment of the ribbon of glass in a continuous process, it is advantageous to keep this contact area as near constant as possible.

Any variation in the configuration of the contact area appears as a change in the intensity of the desired characteristic being imparted to the upper surface of the ribbon of glass and any such change can be sensed anywhere downstream of the body of molten material. Preferably such sensing takes place beyond the outlet end of the bath in the lehr through which the ribbon of glass is advanced as it is being annealed.

Referring to FIG. 1, the sensing is shown as taking place in the open section of the lehr near to the outlet from the lehr where the glass is already cool.

A photocell 39 is mounted on a support bracket 40 fixed to the roof 41 of the lehr. The ribbon of glass is being conveyed beneath the photocell 39 by the conveyor rollers 18 in the lehr. The electric output from the photoelectric device 39 is on leads indicated at 42.

Beneath the path of travel of the ribbon of glass and between two adjacent conveyor rollers there is mounted opposite the photocell 39 a constant output light source in the form of a quartz-iodine lamp 43 which is mounted in a support bracket 44 fixed to the floor of the lehr. The lamp 43 is supplied from a regulated power supply unit by leads indicated at 45. The quartz iodine lamp 43 provides a diffused constant light output below the ribbon over an area of the ribbon which is taken as a sample for sensing the characteristics of the glass.

Any change in the transmission of light through the ribbon which would be caused by a change in the treatment of the ribbon of glass as its passes beneath the body of molten material, results in an output signal from the photoelectric device 39 on the leads 42.

FIG. 3 shows how the signal on line 42 is employed to control the feed of material into the body of molten material as well as controlling the current passing through the body of molten material and the ribbon of glass. A recording device indicated at 46 is connected to the line 42 so as to give a continuous visual indication of the transmission factor of the ribbon of glass. The signal on line 42 also passes to a comparator circuit 47 to which the line 42 is connected. A second input to this comparator circuit on line 48 is obtained from a manually preset potentiometer 49 which is connected to a DC source indicated at 50. The setting of the potentiometer 49 is to a previously calibrated value corresponding to the desired transmission factor to be achieved in the ribbon of glass by the treatment.

In the comparator circuit 47 the transmission of light through the ultimate ribbon of glass measured by the photocell 39 is compared with the setting of the potentiometer corresponding to the desired transmission and the output from the comparator circuit on line 51 is employed to control the current passing between the body of molten material and the glass.

The line 51 carrying the control current output from the comparator circuit is connected to a current control circuit 52 which is supplied with current on a line 53 connected to a power supply circuit (not shown).

The value of the control current on line 51 is measured by a current measurement circuit 54 and recorded by a current recorder 55 to give a visual indication of the current flowing between the body of molten material 36 and the ribbon of glass 32. The recorder 55 is connected by a line 56 to an output from the current measurement circuit.

Another output from the current measurement circuit is on line 57 which is connected to the connection rod 33 of the bar-shaped anode 31. The current control circuit 52 controls the amount of current flowing on line 57 in dependence on the control signal reaching the circuit 52 on line 51. A control output for selective control of the feeding of electrically conductive material into the body of molten material is obtained by a signal on line 58 which is connected to an output from the current measurement circuit.

A graphite feedhead 59 which is indicated generally in FIGS. 1 to 3, is attached to the end of a supply duct 60 which extends through a sidewall of the tank structure and through which duct pellets of electrically conductive material, for example lead shot, are fed to the head 59.

Figure 4:
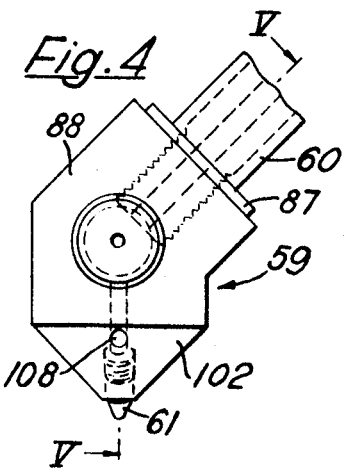
FIG. 4 is a plan view of a graphite feedhead for feeding the electrically conductive material into the body of material which feedhead is illustrated diagrammatically in FIGS. 1, 2 and 3.

The construction and operation of the feedhead 59 are described hereinafter in greater detail with reference to FIGS. 4 and 5. A downwardly inclined graphite spout 61 is fixed into the head and communicates with a reservoir in the head and supplies a regulated feed of molten electrically conductive material into a shallow depression 62 formed in the upper surface of the bar-shaped electrode 31. A narrow bore feed hole 63 extends through the electrode from this depression 62 and opens at the lower face of the electrode 61.

A supply of lead shot is maintained in a dispenser indicated generally at 64, in FIG. 3 and illustrated in greater detail in FIG. 6. The dispenser 64 as shown in FIG. 6 includes a shaped member 65 which defines a hopper between a backplate 66 and a corresponding front plate 67 which is omitted in FIG. 6 for the sake of clarity. The space between the back and front plates 66 and 67 is approximately the same as the diameter of the lead shot being dispensed so that the dispenser marshalls the shot in a vertical layer one shot thick. An outlet channel is formed from the bottom of the reservoir formed by the marshalling hopper 68 formed in the member 65. This channel slopes downwardly as shown at 69 and the lead shot 68a which are marshalled in the hopper, line up in the channel 69 which meets a further channel 70 extending in generally horizontal direction, through the member 65 from one end of the dispenser. This channel 70 leads into a delivery tube 71 which extends outwardly at an angle form the bottom of the dispenser and passes into the supply duct 60 for the graphite feedhead 59.

Lead shot 69a which is lined up in the channel 69 is prevented from running down the delivery tube 71 by a detent member 72 which is mounted in a vertical bore extending upwardly from beneath the hopper into the channel 70. At its bottom this detent member has a head 73 which is held against the lower surface of the member 65 by a leaf spring 74 which is fixed by a bolt 75 to the bottom of the member 65.

An ejection rod 76 extends into the channel 70 from the side of the dispenser and the rod is mounted on a backing plate 77 which is fixed centrally to one end of a piston rod 78. The piston rod is fixed to a piston 79 which is slideably mounted in an actuating cylinder 80 and the piston is urged by a spring 81 into a position in which the ejection rod is withdrawn outwardly from the channel 70. Also fixed to the backing plate 77 is a disturbance rod 82 which projects through a bore 83 formed in the side of the member 65 parallel to the channel 70 but higher up in the channel so that the rod 82 can project into the reservoir of lead shot marshalled in the hopper.

Air under pressure is supplied from an air supply line 84 through a solenoid operated valve 85 on to a line 86 which is connected to the cylinder 80 and the supply of air under pressure to the cylinder urges the backing plate 77 towards the sidewall of the dispenser. The ejection rod engages the pellet which is held at the bottom of the channel 69 against the detent pin 72 and that pin 72 depresses against the action of its spring 74 and a single lead pellet is ejected through the delivery tube 71 into the feedhead.

At the same time the disturbance rod 82 moves into the reservoir of lead pellets and prevents them from bridging across the reservoir and causing starvation of the supply from the dispenser.

The solenoid operated valve 85 receives an electrical pulse of about ½-second duration for each pellet required to be fed, and when the solenoid is deenergized the spring 81 returns the piston to the outer end of the cylinder, the ejection rod 76 and disturbance rod 82 are withdrawn ready for the next operation, and a further pellet becomes located between the inner end of the ejection rod and the detent pin.

The delivery tube 71 is of heat-resistant stainless steel and, as shown in FIG. 5 is held by a nut 86 to the end of the graphite-lined, steel casing 60. The steel casing 60 is sufficiently strong to support the graphite head in desired location above the depression 62 in the bar-shaped electrode 31. At its inner end the steel casing 60 is formed with an annular flange 87 and the main body 88 of the graphite feedhead 59 is bolted to the flange 87 by means of bolts 89 only one of which is shown.

A central hole 90 is drilled downwardly into the graphite head from its upper surface and terminates in a portion 91 of lesser diameter extending downwardly to the vicinity of the bottom of the head. An annular shoulder 92 separates the two parts 90 and 91 of this bore and a plug 93 resets on this shoulder. The plug has a central bore 94 and is formed in its upper face with a funnel-shaped inlet 95 leading into the bore 94. The graphite lining of the supply duct extends beyond the end flange 87 of the steel casing and fits into an inclined bore 97 drilled into the backface of the head at a downwardly inclined angle. This terminating part 98 of the graphite lining extends into the bore 90 in the head and ends just above the funnel-shaped inlet 95 in the plug 93. Pellets of material being fed down the bore 99 of the supply duct fall into the funnel 95 and then, if small enough, fall down through the bore 94 into the lower part 91 of the central bore formed in the graphite head. Larger pellets may melt while supported on the inlet 95.

This lower part 91 of the central bore acts as a reservoir and molten material in the reservoir has a residence period at the temperature of the headspace over the bath so that the pellets are completely melted in the reservoir, and in addition the material in the reservoir reaches chemical equilibrium with the conditions existing in the headspace over the bath. The top of the bore 90 is closed with a cap 100 which has a central bore 101 which ensures access of the atmosphere in the headspace over the bath into the space above the molten material in the reservoir.

The front face of the graphite head 88 is formed with a protruding nose 102 which has a sloping lower surface 103 cut away beneath the head. Through this surface 103 there is drilled a board 104 which forms a seating for the graphite spout 61 and communicates with a bore 105 of reduced diameter which extends upwardly through the nose to the upper surface 106 of the nose where it meets an upwardly inclined bore 107 which is drilled from the upper surface 106 of the nose 102 to a position near the bottom of the reservoir 91.

Where these two bores 105 and 107 meet they define a knife edge 108 which is arranged to be on a desired level for controlling the level of the molten metal in the reservoir 91 and its bore 94. This highest point 108 of the inclined pipe system in the graphite head determines the feed of molten material from the reservoir through the graphite spout 61 into the depression 62 in the top of the bar 31. When the sensing system indicates a change in the transmission of light through the glass further molten lead is necessary in the body 36 of molten material and pellets of lead are fed individually down the supply duct to raise the level of the molten metal 109 in the reservoir 91 above the level of the knife edge 103 and there is a feed of molten lead down the bore 110 of the spout 61 and through the depression 62 and the bore 63 in the bar 31 into the body of molten lead in order to maintain the configuration of the contact area between the lead and the glass.

In order to ensure the emission of small quantities of liquid metal at any time through the spout 61 the total cross-sectional area at the free liquid surface level in the board 94 is kept as small as possible. The bore 94 may for example have ⅛-inch diameter while the diameter of the internal bore 110 of the spout 61 is three thirty-seconds inches.

The pellets of electrically conductive material which are fed down the supply duct may be of various diameters and as the material is molten at the temperature of operation of the bath the pellets may begin to melt as they move down the duct, otherwise they melt on the inlet 95 to the reservoir 91 and the material runs down into the reservoir, or the pellets fall down the bore 94 into the molten metal 109 in the reservoir where they quickly melt.

For example pellets which are one-quarter inch in diameter melt in the tapered funnel-shaped inlet 95 and emission of molten metal through the bore 110 of the spout 61 occurs shortly after a pellet has been fed down the supply tube.

The pellets may be shot through the supply tube 71 under the section of a gas which is usually the same gas as the protective atmosphere maintained in the headspace over the bath and which also acts as a purge gas. An inlet for gas may be provided in the duct part 71 outside the tank structure and purge gas vent holes 111 are provided through the steel casing 60 and the graphite lining 96 of the supply duct near to the graphite head. Purge gas also escapes through the bore 101 in the cap 100 fitted in the top of the graphite head.

The feed of molten lead into the body of molten lead 36 is thus a regulated feed which takes place only when the height of molten lead in the reservoir exceeds the height of the knife edge 108. This feeding is a slow feeding without any surge of molten metal since the reservoir exerts a damping effect, which is further assisted by the presence of the depression 62 in the upper surface of the electrode bar 31 and the narrow bore tube 63 leading downwardly beneath the depression through the electrode.

When there is an output from the current measurement circuit 54 on line 58 indicating a change in the transmission of light through the ribbon of glass a pulse of ½-second second duration is generated in a control circuit 112, see FIG. 3, for the dispenser 64 which control circuit is connected by an output line 113 to the solenoid operated air valve 85.

Figure 7:
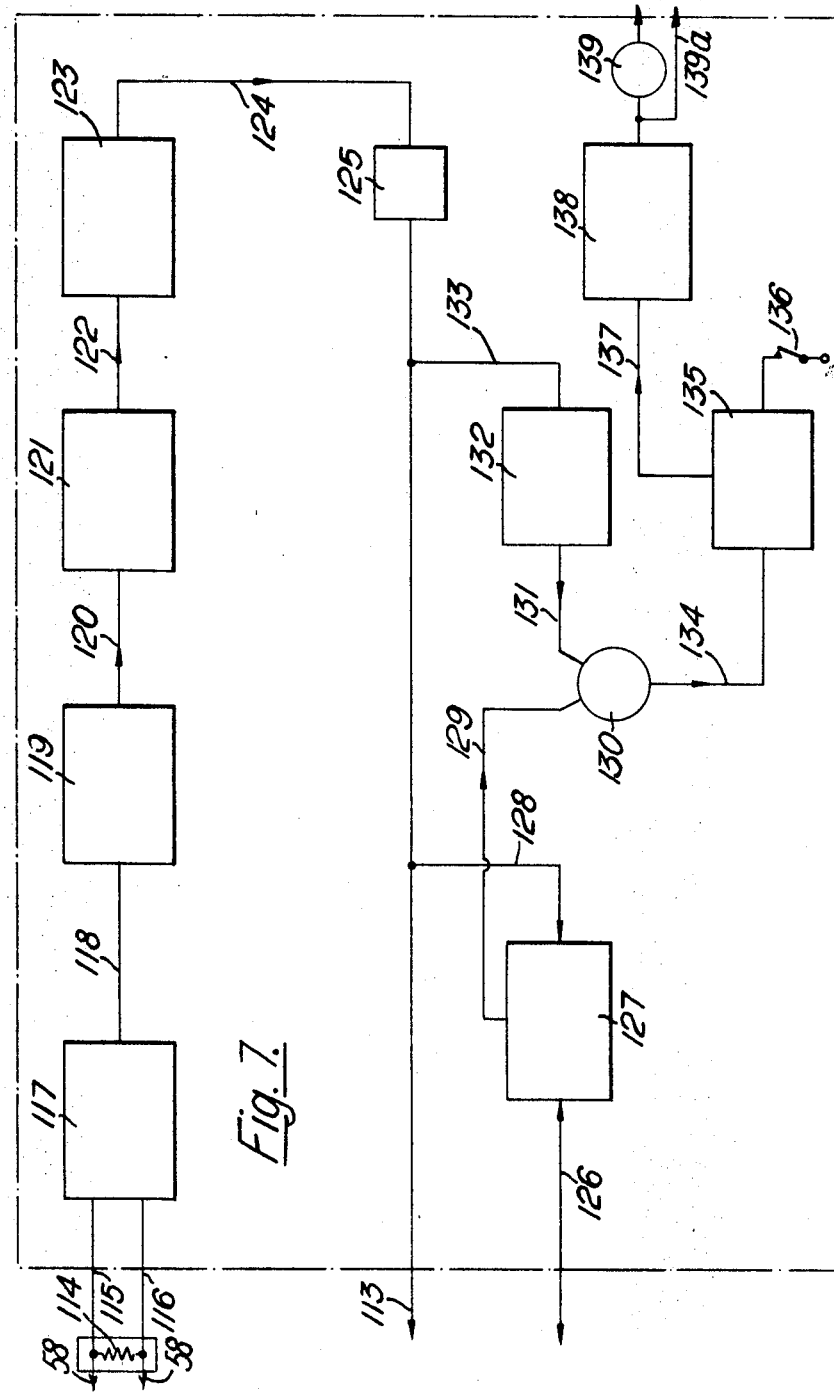
FIG. 7 illustrates schematically the electric control circuit of the dispenser hopper.

The control circuit 112 for the dispenser 64 is illustrated in more detail in FIG. 7. The output from the current measurement circuit is on two lines, indicated at 58, across which a shunt resistor 114 is connected. The voltage developed across this resistor 114 indices an output from the current measurement circuit and this voltage is transmitted on lines 115 and 116 to a DC amplifier 117 whose amplified output on line 118 is connected to a voltage control pulse generator 119. The pulse generator 119 is capable of manual control and is triggered to produce a train of pulses when the output on line 118 has reached a predetermined height indicating the necessity for feeding a pellet from the dispenser 64 into the feedhead 59 in order to compensate for an increase in the transmission of light through the ultimate ribbon of glass being sensed in the lehr. The output from the pulse generator 119 is a train of pulses on line 120 which is connected to a divider chain circuit 121. This is a binary divider which produces an output pulse indicating that a pellet is to be fed and this output pulse on line 122 is shaped by a monostable circuit 123 to produce the driving pulse of ½-second duration necessary for operating the solenoid valve 85. This driving pulse is transmitted on line 124 through an electromagnetic counter 125 which is connected in the circuit to count the number of pellets fed and then on to line 113 which is connected to the solenoid operated valve 85.

An alarm device is also included in the control circuits for the dispenser and the alarm device is illustrated at the bottom of FIG. 7. This device is included in order to indicate when the dispenser is empty. A microswitch in the floor of the hopper opens when the dispenser is emptied of pellets since there are no longer any pellets to bear down on the microswitch, and the opening of the switch causes the feeding of an input on line 126 which is connected to one input of a bistable circuit 127. The second input to this circuit is on a line 128 which is connected to the line 113.

Each time a pulse is emitted on line 113 the bistable circuit 127 remains in one state. When a pulse on line 126 indicates that the dispenser is empty the bistable circuit 127 changes to its second state and on receipt of the next pulse on line 113 the resetting of the circuit 127 back to its first state causes the emission of an output pulse on line 129 which is connected to one input of an AND gate 130. The second input to the gate 130 on line 131 is from a monostable circuit 132 with a differentiated output which also receives the driving pulse on line 113 which is transmitted to the monostable circuit on line 133. The differential output from the circuit 132 arrives at the gate 130 at the same time as a pulse on the line 129 and an output from the gate 130 on line 134 only occurs when the pulse on line 129 is present. An output on line 134 sets an alarm bistable circuit 135, which can be reset manually by a switch 136, and when the bistable circuit 135 is set an output on line 137 is transmitted through an output amplifying stage 138 to a lamp 139 which lights up indicating that the dispenser requires attention and if necessary on line 139a to an external warning device such as a hooter.

Since the current output to the anode 31 on line 57 is generated in the same circuit as the current output to the controller for the dispenser on line 58 the feed of pellets down the tube 71 from the dispenser is at a rate commensurate with the intensity of the current passing between the body of molten material 36 and the glass 32. Thus the closed loop control of the transmission factor of the ribbon of glass includes the control of frequency of delivery of pellets to the feeding head 59 in proportion to the current flowing between the body of molten material 36 and the glass. In this way the desired configuration of the contact area between the body of molten material and the glass surface is maintained sufficient to produce the desired characteristic in the ribbon of glass.

When the apparatus is operating continuously and uniformly there is a regular feed of pellets individually down the supply tube 71 and a gradual and uniform feed of molten material, for example molten lead, into the body of molten material 36 at a rate commensurate with the rate at which material is being transferred by the electric current from the body 36 into the upper surface of the ribbon of glass 32.

Any desired metal, alloy or salt which is molten at the operating temperature of the float process in that part of the tank structure where the body of molten material is maintained in contact with the surface of the glass, may be introduced in this manner into the body 36 under control of the automatic control loop.

A simplified graphite feedhead is illustrated in FIGS. 8 and 9. A target hole 140 formed in the upper surface of the bar 31 is larger than the depression 62 in the bar illustrated in FIG. 5 and a fine-bore feedhole, for example of ⅛-inch diameter, indicated at 141, extends through the thickness of the bar from the target hole 140. Molten material is usually retained in the target hole 140 and the level of molten material is indicated at 142.

The feed of molten material, for example molten lead, into the target hole 140 is from a nozzle 143 which extends downwardly from a graphite head 144. The graphite head 144 is fixed to the annular flange 87 on the end of the graphite line steel casing 60 of the supply duct.

A wide bore is drilled into one end of the head as indicated at 145. This bore is threaded and screws on to the end part 146 of the graphite lining 96, which end part extends beyond the end of the steel casing 60. A narrower bore 147 in the head matches with the bore in the graphite part 145. The supply bore 147 is drilled into the head and terminates in a depression 148. The nozzle 143 has a bore 149 drilled upwardly so as to communicate with the supply bore 147 and the bore 149 of the nozzle extends upwardly through the top of the head as indicated at 150 to provide an outlet for purging gas being fed through the supply duct. Purged gas vent holes 111 are also formed through the casing 60 and the graphite lining 96 just before the flange 87. Pellets from the dispenser fall down the supply tube 71, their movement being assisted by the action of the purging gas and each pellet hits the depression 148 formed inside the head and so loses its horizontal velocity and drops through the bore 149 in the nozzle 143 into the target hole 140 formed in the upper surface of the bar-shaped electrode 31.

The pellets may already have melted by the time they drop through the bore 149 in which case the molten material drips straight into the reservoir 142 of molten material in the target hole 140. Alternatively if the pellet has not melted then it melts while in the target hole to reconstitute the reservoir 142 and the molten material in this reservoir reaches the bath operating conditions while held in the reservoir and as it gradually runs downwardly through the fine-bore feedhole 141 into the body of molten material 36.

With each arrangement described above there is no extraction of heat from the body of molten material in order to melt the pellets being supplied and the retaining of the molten material in a reserve of molten material before it is fed into the body 36 not only ensures that it has reached the same temperature as the molten material in the body before further feeding forward takes place but also ensures that the material being supplied reaches the same chemical state with respect to the headspace over the bath as the state of the body of molten material.

The frequent and controlled supply of molten material into the body 36 which clings to the bar-shaped electrode 31 ensures that the configuration of the contact area of the body 36 with the glass remains constant, so that there is no appreciable variation of the length of the body of molten material considered in the direction of advance of the ribbon of glass, and the depth of treatment of the ribbon of glass is maintained constant throughout the continuous operation of the process.

We claim:

1. Apparatus for use in the manufacture of float glass having desired characteristics, comprising a tank structure containing a bath of molten metal, means for delivering glass at a controlled rate to the bath and advancing the glass in ribbon form along the bath, temperature regulators in the tank structure for thermally conditioning the advancing glass, means for holding a body of molten material in contact with the upper surface of the advancing ribbon of glass, means for producing migration of ions from said body of molten material into the glass, a supply duct for the material terminating adjacent said holding means, a photoelectric sensing device for sensing the intensity of a characteristic of the treated ribbon, which device is mounted beyond the outlet for the ribbon from the tank structure, and means responsive to the sensing means which controls the supply of material through said duct to the body of molten material.

2. Apparatus according to claim 1, including a supply container for said material having a valved outlet for controlling the feeding of material from that container, which outlet is connected to said supply duct, and a control device for the valved outlet, which control device is connected to the sensing device and is operable in response to an electrical signal therefrom indicative of a change in the characteristic being sensed to control the feeding of said material into the supply duct.

3. Apparatus according to claim 2, wherein said ion-migration producing means includes the holding means for the body of molten material constituted as an anode, and a current supply circuit connected to the holding means, and the current supply circuit includes regulating means connected to the sensing device, whereby the current supplied to the anode is variable under control of any change in characteristic of the glass.

4. Apparatus according to claim 1, wherein the body of molten material is located in contact with the glass surface by clinging to a bar-shaped locating member mounted in the tank structure across and above the path of travel of the glass, and a feed hole is formed down through the bar originating in a depression in the top surface of the bar into which depression the material is fed.

5. Apparatus according to claim 1, wherein the supply duct leads to a reservoir of the molten material mounted above the path of travel of the ribbon of glass, and a discharge outlet from the reservoir is formed to regulate the feed of molten material towards the body.

6. Apparatus according to claim 5, wherein the inlet to the discharge outlet is located at a predetermined height relative to the reservoir so that feeding of molten material from the reservoir only takes place when the height of molten material in the reservoir exceeds that predetermined height.

7. Apparatus according to claim 6, wherein the reservoir is formed in a graphite feedhead fixed to and supported by the supply duct which is constituted by a graphite lined steel casing to which casing the head is fixed, a downwardly inclined graphite spout is fixed into the head, and the spout communicates with the reservoir by an inclined pipe system in the graphite head which defines a knife edge at its highest point on a level with the liquid level in the reservoir, so that the supply of material into the reservoir through the duct causes a feed of molten material down the spout into the body of molten material.

8. Apparatus according to claim 4, wherein the depression in the top surface of the bar is formed as a target hole in which a reserve of molten material can be held, a fine-bore feed hole passes through the bar from the target hole, and a graphite feedhead is mounted above the target hole on the end of a supply duct which supports the head, the head being formed with a supply hole communicating with the supply duct through which pellets of the material are supplied, and a nozzle communicating with the supply hole through which the electrically conductive material falls into the target hole in the bar.

9. In a method of manufacturing float glass having a desired characteristic wherein a ribbon of glass is advanced along a bath of molten metal, the improvement which comprises maintaining a body of molten material in contact with the upper surface of the advancing ribbon of glass, controlling migration of ions into the glass surface from said body of molten material to produce that characteristic in the glass surface, photoresponsively sensing a change in that characteristic of the glass surface, producing an electrical signal indicative of that change, and employing that signal to influence said control to restore a desired rate of modification of the glass surface.

10. A method according to claim 9, comprising maintaining the configuration of the contact area between said body of molten material and the glass surface sufficient to produce said desired characteristic, by sensing photoelectrically light transmitted through the treated ribbon of glass, producing an electrical signal indicative of any change in the light transmitted, and employing that signal to regulate the feeding of material into the body of molten material contacting the glass.

11. A method of manufacturing float glass having a desired characteristic, comprising advancing a ribbon of glass along a bath of molten metal, confining a body of molten electrically conductive material in contact with the upper surface of said ribbon of glass, feeding molten material into said body, passing controlled electric current between the electrically conductive material and the glass in order to produce a desired characteristic in the glass, photoelectrically sensing light transmitted through the treated ribbon of glass, producing an electrical signal indicative of any change in the light transmitted, and employing that signal to regulate said feeding of electrically conductive material into the body of molten material contacting the glass.

12. A method according to claim 11, comprising employing said signal for selective control of the feeding of material into said body and of the electric current passed between the body of molten material and the glass.

13. A method according to claim 11, which comprises employing the signal to control a feed of the material into a molten reserve of that material, from which reserve there is a regulated feed of molten material into the body of molten material contacting the glass.